US011820847B2

(12) United States Patent
Kim et al.

(10) Patent No.: US 11,820,847 B2
(45) Date of Patent: Nov. 21, 2023

(54) COPOLYMER, METHOD OF PREPARING THE SAME, AND RUBBER COMPOSITION INCLUDING THE SAME

(71) Applicant: Korea Kumho Petrochemical Co., Ltd., Seoul (KR)

(72) Inventors: Tae Hee Kim, Daejeon (KR); Jae Young Ko, Daejeon (KR)

(73) Assignee: Korea Kumho Petrochemical Co., Ltd., Seoul (KR)

( * ) Notice: Subject to any disclaimer, the term of this patent is extended or adjusted under 35 U.S.C. 154(b) by 0 days.

(21) Appl. No.: 17/857,768

(22) Filed: Jul. 5, 2022

(65) Prior Publication Data
US 2023/0192934 A1   Jun. 22, 2023

(30) Foreign Application Priority Data
Dec. 20, 2021  (KR) .................. 10-2021-0182444

(51) Int. Cl.
  *C08F 297/04*    (2006.01)
  *C08F 236/22*    (2006.01)
  *C08F 8/42*      (2006.01)

(52) U.S. Cl.
  CPC .............. *C08F 236/22* (2013.01); *C08F 8/42* (2013.01); *C08F 297/042* (2013.01)

(58) Field of Classification Search
  CPC ...... C08L 53/02; C08F 136/22; C08F 236/22; C08F 236/10
  See application file for complete search history.

(56) References Cited

U.S. PATENT DOCUMENTS

2021/0017378 A1*  1/2021  Koda .................... C08F 236/22

FOREIGN PATENT DOCUMENTS

| JP | 2017014374 A | * | 1/2017 | | |
| WO | WO-2017038724 A1 | * | 3/2017 | ............... | B60C 1/00 |
| WO | WO-2019189572 A1 | * | 10/2019 | ............... | B60C 1/00 |

OTHER PUBLICATIONS

WO2017038724 English Machine Translation, prepared May 23, 2023. (Year: 2023).*
JP2017014374 English Machine Translation, prepared May 23, 2023. (Year: 2023).*

* cited by examiner

*Primary Examiner* — Christopher M Rodd
(74) *Attorney, Agent, or Firm* — NKL LAW; Jae Youn Kim

(57) ABSTRACT

An embodiment of the present specification provides a method of preparing a copolymer, which includes steps of: (a) adding a polymerization initiator to a monomer mixture including an aromatic vinyl-based monomer, a first conjugated diene-based monomer, and a farnesene monomer to initiate a reaction; and (b) adding a second conjugated diene-based monomer.

10 Claims, No Drawings

COPOLYMER, METHOD OF PREPARING THE SAME, AND RUBBER COMPOSITION INCLUDING THE SAME

CROSS-REFERENCE TO RELATED APPLICATION

This application claims priority to and the benefit of Korean Patent Application No. 10-2021-0182444, filed on Dec. 20, 2021, the disclosure of which is incorporated herein by reference in its entirety.

BACKGROUND

1. Field of the Invention

The present specification relates to a copolymer including a farnesene monomer and a method of preparing the same.

2. Discussion of Related Art

Recently, as interest in environmentally-friendly and energy-saving high-performance tires has increased, various studies have been conducted to develop high-performance rubber harmoniously having dynamic properties such as rotation resistance and wetting resistance, mechanical properties, and processability. Particularly, high levels of abrasion resistance and gripping performance have been absolutely required.

In order to enhance the abrasion resistance of tires, a method of preparing a polymer used in a rubber composition for a tire tread to have a high molecular weight and a method of increasing the usage amount of a filler such as carbon black or silica are known. However, when a rubber composition for a tire tread is mixed with a high-molecular-weight rubber or when the amount of carbon black or silica increases, the hardness of a rubber composition increases, and thus processability is degraded.

Typically, to enhance the processability of a rubber composition, a method of adding a processing oil, a liquid rubber, an adhesive resin, or the like is known. However, the addition thereof causes the strength and mechanical properties of a rubber composition to be degraded. Therefore, there is a need to develop a rubber composition for a tire tread, which exhibits excellent processability and abrasion resistance and is also excellent in strength and mechanical properties.

SUMMARY OF THE INVENTION

The description of the present specification is intended to solve the problems of the related art described above, and one object of the present specification is to provide a copolymer including a farnesene monomer, which is capable of increasing the processability of a rubber composition and enhancing the abrasion resistance and dynamic properties of a tire which is a final product, and a method of preparing the same.

Another object of the present specification is to provide a rubber composition which exhibits excellent processability and abrasion resistance and is also excellent in strength and mechanical properties.

One aspect of the present specification provides a method of preparing a copolymer, which includes steps of: (a) adding a polymerization initiator to a monomer mixture including an aromatic vinyl-based monomer, a first conjugated diene-based monomer, and a farnesene monomer to initiate a reaction; and (b) adding a second conjugated diene-based monomer.

In an embodiment, the aromatic vinyl-based monomer may be one selected from the group consisting of styrene, α-methylstyrene, 2-methylstyrene, 3-methylstyrene, 4-methylstyrene, 2,4-dimethylstyrene, 2,4-diisopropylstyrene, 4-propylstyrene, 4-cyclohexylstyrene, 4-(p-methylphenyl)styrene, 5-tert-butyl-2-methylstyrene, tert-butoxystyrene, 2-tert-butylstyrene, 3-tert-butylstyrene, 4-tert-butylstyrene, N,N-dimethylaminoethylstyrene, 1-vinyl-5-hexylnaphthalene, 1-vinylnaphthalene, divinylnaphthalene, divinylbenzene, trivinylbenzene, vinylbenzyldimethylamine, (4-vinylbenzyl)dimethylaminoethylether, vinylpyridine, vinylxylene, diphenylethylene, diphenylethylene including a tertiary amine, styrene including a primary, secondary, or tertiary amine, and a combination of two or more thereof.

In an embodiment, the first conjugated diene-based monomer and the second conjugated diene-based monomer may each be one selected from the group consisting of 1,3-butadiene, isoprene, 2,3-dimethyl-1,3-butadiene, 1,3-pentadiene, 1,3-hexadiene, 2-phenyl-1,3-butadiene, 3-methyl-1,3-pentadiene, 2-chloro-1,3-butadiene, 3-butyl-1,3-octadiene, octadiene, and a combination of two or more thereof.

In an embodiment, a weight ratio of the aromatic vinyl-based monomer, the first conjugated diene-based monomer, and the farnesene monomer in the monomer mixture may be 20 to 50:30 to 70:10 to 30.

In an embodiment, the second conjugated diene-based monomer may be added in an amount of 1 to 30 parts by weight based on 100 parts by weight of the first conjugated diene-based monomer.

In an embodiment, the method of preparing a copolymer may further include, after step (b), step (c) of adding a compound represented by the following Chemical Formula 1 or Chemical Formula 2:

[Chemical Formula 1]

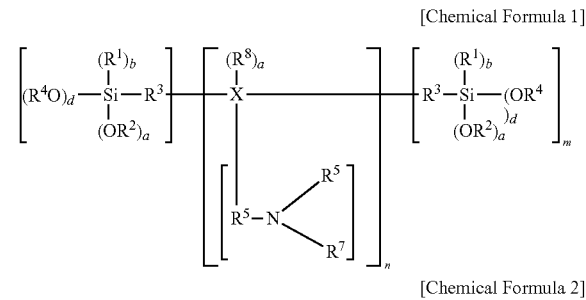

[Chemical Formula 2]

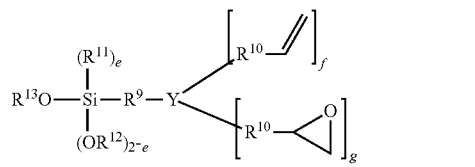

in Chemical Formula 1 and Chemical Formula 2, $R^1$ to $R^7$ are each one of $C_1$ to $C_{20}$ saturated or unsaturated hydrocarbon chains, $R^8$ is hydrogen (H) or one of $C_1$ to $C_{20}$ saturated or unsaturated hydrocarbon chains, $R^9$ to $R^{13}$ are each one of $C_1$ to $C_{20}$ saturated or unsaturated hydrocarbon chains, X is carbon (C), silicon (Si), or nitrogen (N), Y is oxygen (O) or nitrogen (N), a is an integer of 0 to 2, b, c, and d are each an integer of 0 to 3 and satisfy b+c+d=3, e, f, and g are each an integer of 0 to 2, n is an integer of 1 to 200, and m is an integer of 0 to 2.

In an embodiment, the method of preparing a copolymer may further include, after step (b), step (c') of adding a terminal-modifying compound, and the terminal-modifying compound may be one selected from the group consisting of piperidine, 1-[(4-ethylphenyl)methyl]-pyrrolidine, 1-(4-vinylbenzyl)pyrrolidine, N1-(3-(dimethylamino)propyl)-N3,N3-dimethyl-N1-(4-vinylbenzyl)propane-1,3-diamine, N1-(3-(dimethylamino)propyl)-N3,N3-dimethyl-N1-(4-vinylphenethyl)propane-1,3-diamine, N1-(2-(dimethylamino)ethyl)-N2,N2-dimethyl-N1-(4-vinylbenzyl)ethane-1,2-diamine, N1-(3-(diethylamino)propyl)-N3,N3-diethyl-N1-(4-vinylbenzyl)propane-1,3-diamine, triethoxysilylpropyldiethylamine, 3-glycidoxypropyldimethyldimethoxysilane, dimethyldichlorosilane, trimethylchlorosilane, methyldichlorosilane, methyltrichlorosilane, phenyltrichlorosilane, vinyltrichlorosilane, and a combination of two or more thereof.

Another aspect of the present specification provides a copolymer which includes an aromatic vinyl-based monomer, a conjugated diene-based monomer, and a farnesene monomer and has an aromatic vinyl-based block content of less than 1 wt %.

In an embodiment, at least one end of the copolymer may be modified with a compound represented by the following Chemical Formula 1 or Chemical Formula 2:

[Chemical Formula 1]

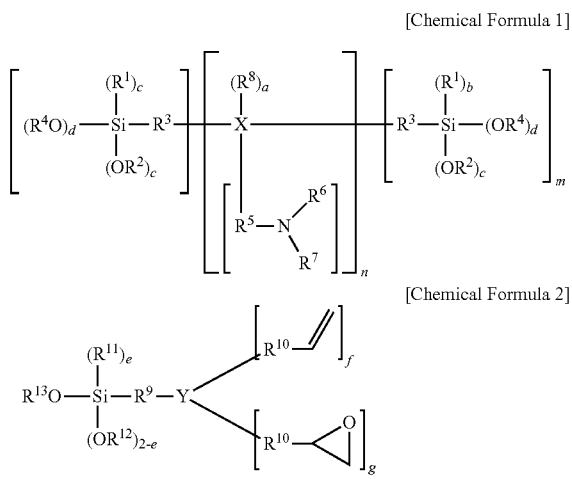

[Chemical Formula 2]

in Chemical Formula 1 and Chemical Formula 2, $R^1$ to $R^7$ are each one of $C_1$ to $C_{20}$ saturated or unsaturated hydrocarbon chains, $R^8$ is hydrogen (H) or one of $C_1$ to $C_{20}$ saturated or unsaturated hydrocarbon chains, $R^9$ to $R^{13}$ are each one of $C_1$ to $C_{20}$ saturated or unsaturated hydrocarbon chains, X is carbon (C), silicon (Si), or nitrogen (N), Y is oxygen (O) or nitrogen (N), a is an integer of 0 to 2, b, c, and d are each an integer of 0 to 3 and satisfy b+c+d=3, e, f, and g are each an integer of 0 to 2, n is an integer of 1 to 200, and m is an integer of 0 to 2.

In an embodiment, at least one end of the copolymer may be modified with a terminal-modifying compound, and the terminal-modifying compound may be one selected from the group consisting of piperidine, 1-[(4-ethylphenyl)methyl]-pyrrolidine, 1-(4-vinylbenzyl)pyrrolidine, N1-(3-(dimethylamino)propyl)-N3,N3-dimethyl-N1-(4-vinylbenzyl)propane-1,3-diamine, N1-(3-(dimethylamino)propyl)-N3,N3-dimethyl-N1-(4-vinylphenethyl)propane-1,3-diamine, N1-(2-(dimethylamino)ethyl)-N2,N2-dimethyl-N1-(4-vinylbenzyl)ethane-1,2-diamine, N1-(3-(diethylamino)propyl)-N3,N3-diethyl-N1-(4-vinylbenzyl)propane-1,3-diamine, triethoxysilylpropyldiethylamine, 3-glycidoxypropyldimethyldimethoxysilane, dimethyldichlorosilane, trimethylchlorosilane, methyldichlorosilane, methyltrichlorosilane, phenyltrichlorosilane, vinyltrichlorosilane, and a combination of two or more thereof.

Still another aspect of the present specification provides a rubber composition which includes the above-described copolymer and a filler.

DETAILED DESCRIPTION OF EXEMPLARY EMBODIMENTS

Hereinafter, exemplary embodiments of the present specification will be described in detail with reference to accompanying drawings. However, it should be understood that the description of the present specification can be implemented in various forms, and that it is not intended to limit the present specification to the exemplary embodiments. Also, in the drawings, descriptions of parts unrelated to the detailed description are omitted to clearly describe the present specification. Throughout the specification, like numbers refer to like elements.

Throughout the specification, a certain part being "connected" to another part means that the certain part is "directly connected" to the other part or that the certain part is "indirectly connected" to the other part through another member interposed between the two parts. Also, a certain part "including" a certain element signifies that the certain part may further include, instead of excluding, another element unless particularly indicated otherwise.

When a numerical value is presented herein, the value has the precision of the significant digit provided in accordance with the standard rules in chemistry for significant digits unless its specific range is stated otherwise. For example, the numerical value 10 includes the range of 5.0 to 14.9 and the numerical value 10.0 includes the range of 9.50 to 10.49.

Method of Preparing Copolymer

A method of preparing a copolymer according to one aspect of the present specification includes steps of: (a) adding a polymerization initiator to a monomer mixture including an aromatic vinyl-based monomer, a first conjugated diene-based monomer, and a farnesene monomer to initiate a reaction; and (b) adding a second conjugated diene-based monomer.

Step (a) is a step intended to initiate polymerization of a monomer mixture including an aromatic vinyl-based monomer, a first conjugated diene-based monomer, and a farnesene monomer and may be performed by typical anionic polymerization.

The farnesene monomer may be easily copolymerized with an aromatic vinyl-based monomer or a conjugated diene-based monomer by including a double bond. A unit structure derived from the farnesene monomer may impart a short-chain branch having a double bond to the copolymer structure. When the density of the above-described branch is high in the copolymer structure, it may be in the form of a brush or a bottle brush. Although there may be a trade-off relationship between an effect of enhancing the processability of a rubber resulting from the unit structure and the fuel efficiency, strength, or mechanical properties of a rubber composition, the effect may be improved by adjusting the location and proportion of each unit structure in the copolymer.

The aromatic vinyl-based monomer may be one selected from the group consisting of styrene, α-methylstyrene, 2-methylstyrene, 3-methylstyrene, 4-methylstyrene, 2,4-dimethylstyrene, 2,4-diisopropylstyrene, 4-propylstyrene, 4-cyclohexylstyrene, 4-(p-methylphenyl)styrene, 5-tert-butyl-2-methylstyrene, tert-butoxystyrene, 2-tert-butylstyrene, 3-tert-butylstyrene, 4-tert-butylstyrene, N,N-dimethylaminoethylstyrene, 1-vinyl-5-hexylnaphthalene, 1-vinylnaphthalene, divinylnaphthalene, divinylbenzene, trivinylbenzene, vinylbenzyldimethylamine, (4-vinylbenzyl)dimethylaminoethylether, vinylpyridine, vinylxylene, diphenylethylene, diphenylethylene including a tertiary amine, styrene including a primary, secondary, or tertiary amine, and a combination of two or more thereof, but the present invention is not limited thereto.

The first conjugated diene-based monomer and the second conjugated diene-based monomer may each be one selected from the group consisting of 1,3-butadiene, isoprene, 2,3-dimethyl-1,3-butadiene, 1,3-pentadiene, 1,3-hexadiene, 2-phenyl-1,3-butadiene, 3-methyl-1,3-pentadiene, 2-chloro-1,3-butadiene, 3-butyl-1,3-octadiene, octadiene, and a combination of two or more thereof, but the present invention is not limited thereto. The first conjugated diene-based monomer and the second conjugated diene-based monomer may be the same as or different from each other.

The farnesene monomer may be one selected from the group consisting of a cis-α-farnesene monomer, a trans-α-farnesene monomer, a cis-β-farnesene monomer, a trans-β-farnesene monomer, and a combination of two or more thereof. For example, the farnesene monomer may be a trans-β-farnesene monomer, but the present invention is not limited thereto.

The farnesene monomer may be introduced into the main chain of a copolymer together with the aromatic vinyl-based monomer and the first conjugated diene-based monomer to enhance the processability of a rubber composition including the copolymer and also enhance the abrasion resistance and dynamic properties of a tire which is a final product.

A weight ratio of the aromatic vinyl-based monomer, the first conjugated diene-based monomer, and the farnesene monomer in the monomer mixture may be 20 to 50:30 to 70:10 to 30.

The aromatic vinyl-based monomer may be included in an amount of 20 to 50 parts by weight based on 100 parts by weight of the sum of monomers included in the monomer mixture. For example, the content of the aromatic vinyl-based monomer may be 20 parts by weight, 25 parts by weight, 30 parts by weight, 35 parts by weight, 40 parts by weight, 45 parts by weight, 50 parts by weight, or a range between two values thereof. When the content of the aromatic vinyl-based monomer is below the above-described range, the content of the aromatic vinyl-based substance in the prepared copolymer is decreased, and thus wetting resistance or tensile strength may be degraded. On the other hand, when the content thereof is above the above-described range, a glass transition temperature may be excessively increased to degrade processability, or an aromatic vinyl-based block may be formed to degrade fuel efficiency.

The first conjugated diene-based monomer may be included in an amount of 30 to 70 parts by weight based on 100 parts by weight of the sum of monomers included in the monomer mixture. For example, the content of the first conjugated diene-based monomer may be 30 parts by weight, 35 parts by weight, 40 parts by weight, 45 parts by weight, 50 parts by weight, 55 parts by weight, 60 parts by weight, 65 parts by weight, 70 parts by weight, or a range between two values thereof. When the content of the first conjugated diene-based monomer is out of the above-described range, an aromatic vinyl-based block may be formed to degrade fuel efficiency, or a vinyl content may be excessively increased to degrade the processability of the prepared copolymer.

The farnesene monomer may be included in an amount of 10 to 30 parts by weight based on 100 parts by weight of the sum of monomers included in the monomer mixture. For example, the content of the farnesene monomer may be 10 parts by weight, 15 parts by weight, 20 parts by weight, 25 parts by weight, 30 parts by weight, or a range between two values thereof. When the content of the farnesene monomer is out of the above-described range, processability may be insufficient or mechanical properties may be degraded.

The monomer mixture may further include a solvent. The solvent may be one selected from the group consisting of an aliphatic hydrocarbon-based solvent, a cyclic aliphatic hydrocarbon-based solvent, an aromatic hydrocarbon-based solvent, and a combination of two or more thereof. For example, the solvent may be one selected from the group consisting of n-pentane, n-hexane, n-heptane, isooctane, cyclohexane, methylcyclopentane, toluene, benzene, xylene, and a combination of two or more thereof, but the present invention is not limited thereto. The content of the solvent may be 4.5 to 6.5 times the total weight of monomers included in the monomer mixture and, for example, 4.5 times, 5 times, 5.5 times, 6 times, 6.5 times, or a range between two values thereof. When the content of the solvent is below the above-described range, the molecular weight distribution of the prepared copolymer may be increased, and when the content of the solvent is above the above-described range, a reaction time may be excessively increased.

The monomer mixture may further include a randomizing agent. The randomizing agent may be one selected from the group consisting of tetrahydrofuran, di-n-propyl ether, diisopropyl ether, diethyl ether, diethylene glycol dimethyl ether, di-n-butyl ether, ethyl butyl ether, triethylene glycol, 1,2-dimethoxybenzene, ditetrahydrofurylpropane, ditetrahydrofurfurylpropane, ethyltetrahydrofurfurylether, trimethylamine, triethylamine, N,N,N,N-tetramethylethylene diamine and a combination of two or more thereof. For example, the randomizing agent may be tetrahydrofuran, but the present invention is not limited thereto.

The polymerization initiator may be an organometallic compound, and the organometallic compound may be one selected from the group consisting of an organolithium compound, an organosodium compound, an organopotassium compound, an organorubidium compound, an organocesium compound, and a combination of two or more thereof. For example, the polymerization initiator may be one selected from the group consisting of methyl lithium, ethyl lithium, isopropyl lithium, n-butyl lithium, sec-butyl lithium, tert-butyl lithium, and a combination of two or more thereof, but the present invention is not limited thereto.

An initiation temperature of the polymerization may be 10 to 100° C. For example, the initiation temperature may be 10° C., 15° C., 20° C., 25° C., 30° C., 35° C., 40° C., 45° C., 50° C., 55° C., 60° C., 65° C., 70° C., 75° C., 80° C., 85° C., 90° C., 95° C., 100° C., or a range between two values thereof. When the initiation temperature of the polymerization is below the above-described range, a reaction rate may be decreased to degrade economic efficiency, and when the initiation temperature of the polymerization is above the above-described range, it may be difficult to control the reaction.

The polymerization may be adiabatic polymerization and may be performed by batch-type or continuous polymerization, but the present invention is not limited thereto.

Step (b) is a step intended to suppress the formation of an aromatic vinyl-based block and substitute at least one end of a copolymer with a unit structure derived from a conjugated diene-based monomer by further adding a conjugated diene-based monomer. The aromatic vinyl-based block may be produced due to a difference in reactivity between an aromatic vinyl-based monomer and a conjugated diene-based monomer and may act as a major cause of heat generation depending on a location in the polymer chain to cause fuel efficiency loss caused by rolling resistance.

By further adding the conjugated diene-based monomer of step (b), the content of an aromatic vinyl-based block in a copolymer which is a product of step (b) may be less than 1 wt % based on the total weight of the copolymer. As an example, the product of step (b) may not include an aromatic vinyl-based block.

By further adding the conjugated diene-based monomer of step (b), at least one end of a copolymer which is a product of step (b) may have a unit structure derived from the conjugated diene-based monomer.

In step (b), at least one end of a copolymer may be formed to have a unit structure derived from the conjugated diene-based monomer to improve the dynamic characteristics, abrasion resistance, and gripping characteristics of the copolymer. As described above, a unit structure derived from the farnesene monomer may generally improve the processability of a copolymer, but it may degrade the fuel efficiency, strength, or mechanical properties of a final product. On the other hand, a copolymer prepared according to an embodiment of the present specification may impart properties suitable for tire application by adjusting the unit structure of end of the copolymer in step (b).

The further addition of the conjugated diene-based monomer of step (b) may be performed once, but the present invention is not limited thereto.

The second conjugated diene-based monomer may be added in an amount of 1 to 30 parts by weight based on 100 parts by weight of the first conjugated diene-based monomer. For example, the addition amount of the second conjugated diene-based monomer may be 1 part by weight, 2 parts by weight, 3 parts by weight, 4 parts by weight, 5 parts by weight, 6 parts by weight, 7 parts by weight, 8 parts by weight, 9 parts by weight, 10 parts by weight, 11 parts by weight, 12 parts by weight, 13 parts by weight, 14 parts by weight, 15 parts by weight, 16 parts by weight, 17 parts by weight, 18 parts by weight, 19 parts by weight, 20 parts by weight, 21 parts by weight, 22 parts by weight, 23 parts by weight, 24 parts by weight, 25 parts by weight, 26 parts by weight, 27 parts by weight, 28 parts by weight, 29 parts by weight, 30 parts by weight, or a range between two values thereof. When the addition amount of the second conjugated diene-based monomer is out of the above-described range, an aromatic vinyl-based block content is increased, or a vinyl content is excessively increased, and thus the properties of the prepared copolymer may be degraded.

The addition of the second conjugated diene-based monomer of step (b) may be performed when a polymerization conversion rate reaches 95% or more. For example, the addition may be performed when a polymerization conversion rate reaches 95%, 96%, 97%, 98%, 99%, 99.5%, or a range between two values thereof. When the addition of step (b) is performed when a polymerization conversion rate is below the above-described range, the molecular weight distribution of the prepared copolymer may be increased, and when the addition of step (b) is performed when a polymerization conversion rate is above the above-described range, an aromatic vinyl-based block content may be increased.

The second conjugated diene-based monomer may be added when a reaction temperature is increased 25 to 35° C. from the temperature of step (a). For example, the second conjugated diene-based monomer may be added when a reaction temperature is increased 25° C., 30° C., 35° C., or a range between two values thereof from the temperature of step (a), but the present invention is not limited thereto. The reaction temperature means a temperature increased by the reaction of step (a), not by a separate thermal stirrer or the like.

At least one end of a copolymer which is a product of step (b) may include a unit structure derived from the conjugated diene-based monomer which is highly reactive with a terminal-modifying compound.

The method of preparing a copolymer may further include, after step (b), step (c) of adding a terminal-modifying agent.

Step (c) is a step intended to introduce a modifying group to at least one end of a copolymer which is a product of step (b), and the terminal modification of a copolymer may enhance compatibility with a filler included in preparation of a rubber composition.

The terminal-modifying agent may be a polyvalent terminal-modifying agent, but the present invention is not limited thereto.

For example, the terminal-modifying agent may be a compound represented by the following Chemical Formula 1 or Chemical Formula 2.

[Chemical Formula 1]

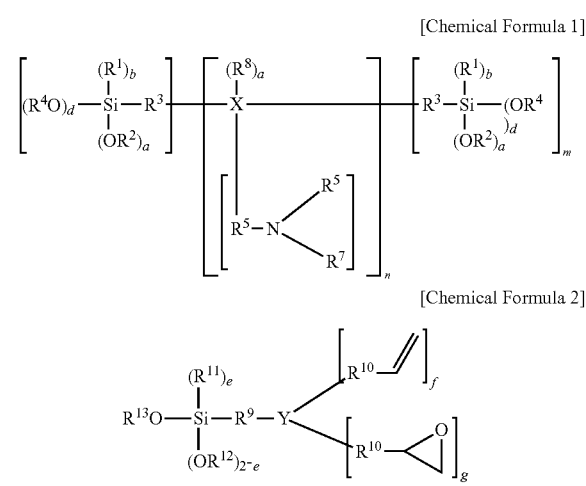

[Chemical Formula 2]

In Chemical Formula 1, $R^1$ to $R^7$ are each one of $C_1$ to $C_{20}$ saturated or unsaturated hydrocarbon chains, $R^8$ is hydrogen (H) or one of $C_1$ to $C_{20}$ saturated or unsaturated hydrocarbon chains, $R^9$ to $R^{13}$ are each one of $C_1$ to $C_{20}$ saturated or unsaturated hydrocarbon chains, X is carbon (C), silicon (Si), or nitrogen (N), Y is oxygen (O) or nitrogen (N), a is an integer of 0 to 2, b, c, and d are each an integer of 0 to 3 and satisfy b+c+d=3, e, f, and g are each an integer of 0 to 2, n is an integer of 1 to 200, and m is an integer of 0 to 2. For example, when m is 1 and X is carbon or silicon, a may be 1, and when m is 1 and X is nitrogen, a may be 0. As another example, in the terminal unit structure of Chemical Formula 1, when a is 0 and X is carbon or silicon, m may be 2, and when a is 0 and X is nitrogen, m may be 1. As still another example, in the terminal unit structure of Chemical Formula 1, when m is 0 and X is carbon or silicon, a may be 2, and when m is 0 and X is nitrogen, a may be 1. In an example, the compound represented by Chemical Formula 1 may be $N^1,N^1$-diethyl-$N^3,N^3$-bis(3-(trimethoxysilyl)propyl) propane-1,3-diamine, $N^1,N^1$-diethyl-$N^2,N^2$-bis(3-(trimethoxysilyl)propyl)ethane-1,2-diamine, or 3-(diethylamino)propyltrimethoxysilane, but the present invention is not limited thereto. In an example, the compound represented by Chemical Formula 2 may be 3-glycidoxypropylmethyl dimethoxysilane or 3-glycidoxypropylmethyl diethoxysilane, but the present invention is not limited thereto.

In step (c), at least one end of a copolymer which is a product of step (b) may be substituted with the terminal-modifying agent.

A silane group of the compound represented by Chemical Formula 1 or the compound represented by Chemical Formula 2 reacts with silica that can be used as a filler of a rubber composition to improve dispersibility, and as a result, the processability and mechanical characteristics of a final product may be enhanced, One or more nitrogen atoms included in the compound represented by Chemical Formula 1 or the compound represented by Chemical Formula 2 increase the physical and chemical bonding strength between a copolymer and a filler in preparation of a rubber composition, and thus the processability of a rubber composition and the dispersibility of a filler may be enhanced, and the mechanical properties and dynamic properties, such as wetting resistance and rotation resistance, of a tire which is a final product may be enhanced.

In another example, the method of preparing a copolymer may further include, after step (b), step (c') of adding a terminal-modifying compound, and the terminal-modifying compound may be one selected from the group consisting of piperidine, 1-[(4-ethylphenyl)methyl]-pyrrolidine, 1-(4-vinylbenzyl)pyrrolidine, N1-(3-(dimethylamino)propyl)-N3,N3-dimethyl-N1-(4-vinylbenzyl)propane-1,3-diamine, N1-(3-(dimethylamino)propyl)-N3,N3-dimethyl-N1-(4-vinylphenethyl)propane-1,3-diamine, N1-(2-(dimethylamino)ethyl)-N2,N2-dimethyl-N1-(4-vinylbenzyl)ethane-1,2-diamine, N1-(3-(diethylamino)propyl)-N3,N3-diethyl-N1-(4-vinylbenzyl)propane-1,3-diamine, triethoxysilylpropyldiethylamine, 3-glycidoxypropyldimethyldimethoxysilane, dimethyldichlorosilane, trimethylchlorosilane, methyldichlorosilane, methyltrichlorosilane, phenyltrichlorosilane, vinyltrichlorosilane, and a combination of two or more thereof.

A nitrogen or silicon atom included in the terminal-modifying compound may induce an interaction between a copolymer and a filler to improve the dispersibility of a filler, and thus the characteristics of a final product may be improved.

Copolymer

A copolymer according to another aspect of the present specification includes an aromatic vinyl-based monomer, a conjugated diene-based monomer, and a farnesene monomer and has an aromatic vinyl-based block content of less than 1 wt %.

The types, contents, and effects of the aromatic vinyl-based monomer, the conjugated diene-based monomer, and the farnesene monomer have been described above.

Since the copolymer has a low aromatic vinyl-based block content, it is possible to realize remarkably excellent fuel efficiency in manufacture of a tire compared to the related art. The content of the aromatic vinyl-based block may be less than 1 wt % based on the total weight of the copolymer, and the copolymer may not include an aromatic vinyl-based block, but the present invention is not limited thereto. When the content of the aromatic vinyl-based block is 1 wt % or more, heat generation in a tire which is a final product increases, and thus rolling resistance may be increased, resulting in degraded fuel efficiency.

The aromatic vinyl-based block may be identified by various conventional methods such as Fourier-transform infrared spectroscopy (FT-IR), nuclear magnetic resonance (NMR), differential scanning calorimetry (DSC), a Koldhof method, and the like. For example, the presence or absence of the aromatic vinyl-based block may be identified by the Koldhof method in which an aromatic vinyl-based domain in a copolymer is stained with osmic acid and then observed using a transmission electron microscope.

For example, when styrene is used as the aromatic vinyl-based monomer, the aromatic vinyl-based block may refer to a styrene block.

The copolymer includes a unit structure derived from the farnesene monomer, has a controlled aromatic vinyl-based block content, and may harmoniously improve the processability and mechanical properties of a rubber composition, which have been a trade-off relationship in the related art.

At least one end of the copolymer may be modified with a compound represented by the following Chemical Formula 1 or Chemical Formula 2.

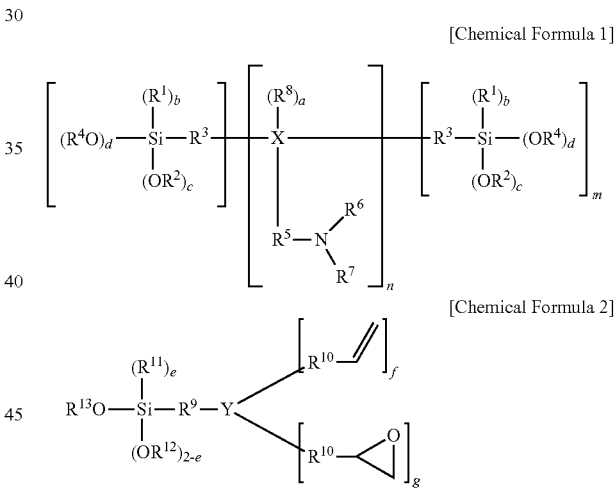

[Chemical Formula 1]

[Chemical Formula 2]

In Chemical Formula 1, $R^1$ to $R^7$ are each one of $C_1$ to $C_{20}$ saturated or unsaturated hydrocarbon chains, $R^8$ is hydrogen (H) or one of $C_1$ to $C_{20}$ saturated or unsaturated hydrocarbon chains, $R^9$ to $R^{13}$ are each one of $C_1$ to $C_{20}$ saturated or unsaturated hydrocarbon chains, X is carbon (C), silicon (Si), or nitrogen (N), Y is oxygen (O) or nitrogen (N), a is an integer of 0 to 2, b, c, and d are each an integer of 0 to 3 and satisfy b+c+d=3, e, f, and g are each an integer of 0 to 2, n is an integer of 1 to 200, and m is an integer of 0 to 2.

The copolymer may have a weight-average molecular weight of 300,000 to 2,000,000 g/mol. For example, the weight-average molecular weight may be 300,000 g/mol, 350,000 g/mol, 400,000 g/mol, 450,000 g/mol, 500,000 g/mol, 550,000 g/mol, 600,000 g/mol, 650,000 g/mol, 700,000 g/mol, 750,000 g/mol, 800,000 g/mol, 850,000 g/mol, 900,000 g/mol, 950,000 g/mol, 1,000,000 g/mol, 1,050,000 g/mol, 1,100,000 g/mol, 1,150,000 g/mol, 1,200,000 g/mol, 1,250,000 g/mol, 1,300,000 g/mol, 1,350,000 g/mol, 1,400,000 g/mol, 1,450,000 g/mol, 1,500,000 g/mol, 1,550,000 g/mol, 1,600,000 g/mol, 1,650,000 g/mol, 1,700,000 g/mol, 1,750,000 g/mol, 1,800,000 g/mol, 1,850,000 g/mol, 1,900,000 g/mol, 1,950,000 g/mol, 2,000,000 g/mol, or a range between two values thereof.

The content of the aromatic vinyl in the copolymer may be 20 to 50 wt %. For example, the content may be 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, 50 wt %, or a range between two values thereof.

The content of the farnesene unit structure in the copolymer may be 10 to 30 wt %. For example, the content may be 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, or a range between two values thereof.

The content of the vinyl in the copolymer may be 15 to 50 mol %. For example, the content may be 15 mol %, 16 mol %, 17 mol %, 18 mol %, 19 mol %, 20 mol %, 21 mol %, 22 mol %, 23 mol %, 24 mol %, 25 mol %, 26 mol %, 27 mol %, 28 mol %, 29 mol %, 30 mol %, 31 mol %, 32 mol %, 33 mol %, 34 mol %, 35 mol %, 36 mol %, 37 mol %, 38 mol %, 39 mol %, 40 mol %, 41 mol %, 42 mol %, 43 mol %, 44 mol %, 45 mol %, 46 mol %, 47 mol %, 48 mol %, 49 mol %, 50 mol %, or a range between two values thereof.

The copolymer may be a random copolymer, but the present invention is not limited thereto.

The copolymer may be synthesized by the above-described method of preparing a copolymer, but the present invention is not limited thereto.

Rubber Composition

A rubber composition according to still another aspect of the present specification includes the copolymer, which includes an aromatic vinyl-based monomer, a conjugated diene-based monomer, and a farnesene monomer and has an aromatic vinyl-based block content of less than 1 wt %, and a filler.

The rubber composition may be a rubber composition for a tire tread, but the present invention is not limited thereto.

The filler may be, for example, at least one selected from silica and carbon black. The copolymer may have excellent processability and mechanical properties even when a large amount of the filler such as silica and carbon black is included.

In an example, the filler may be included in an amount of 10 to 200 parts by weight based on 100 parts by weight of a rubber component included in the rubber composition. For example, the content of the filler may be 10 parts by weight, 15 parts by weight, 20 parts by weight, 25 parts by weight, 30 parts by weight, 35 parts by weight, 40 parts by weight, 45 parts by weight, 50 parts by weight, 55 parts by weight, 60 parts by weight, 65 parts by weight, 70 parts by weight, 75 parts by weight, 80 parts by weight, 85 parts by weight, 90 parts by weight, 95 parts by weight, 100 parts by weight, 105 parts by weight, 110 parts by weight, 115 parts by weight, 120 parts by weight, 125 parts by weight, 130 parts by weight, 135 parts by weight, 140 parts by weight, 145 parts by weight, 150 parts by weight, 155 parts by weight, 160 parts by weight, 165 parts by weight, 170 parts by weight, 175 parts by weight, 180 parts by weight, 185 parts by weight, 190 parts by weight, 195 parts by weight, 200 parts by weight, or a range between two values thereof based on 100 parts by weight of a rubber component, but the present invention is not limited thereto.

The rubber composition may be applied to manufacture a tire due to exhibiting excellent processability and abrasion resistance and having excellent strength and mechanical properties. When the rubber composition is used, the dynamic properties, such as rotation resistance and wetting resistance, of a tire are enhanced, and thus a high-performance tire whose safety and fuel efficiency are improved may be manufactured.

The rubber composition may further include known components or additives typically included in a rubber composition for a tire tread, such as a lubricant, a processing oil, sulfur, a coupling agent, a crosslinking promoter, and an antioxidant, as necessary. For example, the rubber composition may include silica as the filler.

The processing oil may be treated distillate aromatic extract oil (TDAE oil) or distilled tall oil (DTO), but the present invention is not limited thereto.

The content of the processing oil may be 0.1 to 20 parts by weight based on 100 parts by weight of the copolymer. For example, the content may be 0.1 parts by weight, 1 part by weight, 2 parts by weight, 3 parts by weight, 4 parts by weight, 5 parts by weight, 6 parts by weight, 7 parts by weight, 8 parts by weight, 9 parts by weight, 10 parts by weight, 11 parts by weight, 12 parts by weight, 13 parts by weight, 14 parts by weight, 15 parts by weight, 16 parts by weight, 17 parts by weight, 18 parts by weight, 19 parts by weight, 20 parts by weight, or a range between two values thereof. When the content of the processing oil is below the above-described range, the addition thereof may be meaningless, and when the content of the processing oil is above the above-described range, strength and mechanical properties may be degraded.

The rubber composition may exhibit excellent processability and hardness by including the copolymer including a farnesene monomer, and accordingly, the content of processing oil used in preparation of the rubber composition may be reduced or excluded. Therefore, the rubber composition may be applied to manufacture an environmentally-friendly tire.

Hereinafter, exemplary embodiments of the present specification will be described in more detail. However, hereinafter, only experimental results obtained from several selected exemplary embodiments of the specification will be described, and the scope and contents of the present specification should not be interpreted as being reduced or limited by the several selected exemplary embodiments. The effects of each of the various embodiments of the present specification which are not explicitly set forth below will be described in detail in relevant sections.

Preparation Example 1

140 g of styrene, 180 g of 1,3-butadiene, 80 g of a farnesene monomer, 2,200 g of cyclohexane, and 10 ml of tetrahydrofuran were input into a 5 L reactor, and the temperature inside the reactor was adjusted to 35° C. while stirring. When the temperature inside the reactor reached 35° C., 2.4 mmol of n-butyllithium as a polymerization initiator was added to perform adiabatic polymerization. In this case, progress of the polymerization was monitored by a change in reaction temperature, and a small amount of a reaction product was sampled during the reaction to analyze the polymerization conversion rate of the monomer.

When the polymerization conversion rate reached 99%, 9 g of 1,3-butadiene was further added to substitute the end of the reaction product with 1,3-butadiene. Then, 5 mmol of $N^1,N^1$-diethyl-$N^3,N^3$-bis(3-(trimethoxysilyl)propyl)propane-1,3-diamine as a terminal-modifying agent was added to perform a terminal modification reaction.

When the terminal modification was completed, 4 g of butylated hydroxytoluene (BHT) was added to terminate the reaction, and the resulting product was subjected to stripping and roll-drying to obtain a polymer from which the residual solvent and water were removed.

Preparation Example 2

A polymer was obtained in the same manner as in Preparation Example 1, except that $N^1,N^1$-diethyl-$N^3,N^3$-bis(3-(trimethoxysilyl)propyl)propane-1,3-diamine as a terminal-modifying agent was not added.

Comparative Preparation Example 1

A polymer was obtained in the same manner as in Preparation Example 1, except that 260 g of 1,3-butadiene was added instead of 180 g of 1,3-butadiene, and a farnesene monomer was not added.

Comparative Preparation Example 2

A polymer was obtained in the same manner as in Comparative Preparation Example 1, except that dichloro dimethylsilane was added instead of $N^1,N^1$-diethyl-$N^3,N^3$-bis(3-(trimethoxysilyl)propyl)propane-1,3-diamine as a terminal-modifying agent.

Experimental Example 1

The properties of each polymer prepared in Preparation Examples and Comparative Preparation Examples are shown in the following Table 1. In the following Table 1, styrene and vinyl contents were values (mol %) calculated using NMR analysis results, and a weight-average molecular weight was measured by gel permeation chromatography (GPC).

TABLE 1

| Classification | Preparation Example 1 | Preparation Example 2 | Comparative Preparation Example 1 | Comparative Preparation Example 2 |
| --- | --- | --- | --- | --- |
| Weight-average molecular weight (g/mol) | 352,000 | 348,000 | 364,000 | 357,000 |
| Styrene content (mol %) | 36.3 | 36.2 | 35.1 | 35.0 |
| Vinyl content (mol %) | 39.6 | 39.9 | 36.9 | 35.8 |
| Glass transition temperature (° C.) | −34.3 | −34.6 | −33.5 | −33.9 |

EXAMPLES AND COMPARATIVE EXAMPLES

Each polymer prepared in Preparation Examples and Comparative Preparation Examples was mixed with silica under conditions shown in the following Table 2 in a 500 cc lab mixer to prepare a rubber composition for a tire tread, the composition was processed in an open-type twin-screw roll mill to prepare a mixed rubber, and the mixed rubber was vulcanized at 165° C. for 20 minutes to prepare a rubber sample.

TABLE 2

| Composition (parts by weight) | Example 1 | Example 2 | Comparative Example 1 | Comparative Example 2 |
| --- | --- | --- | --- | --- |
| Preparation Example 1 | 120 | — | — | — |
| Preparation Example 2 | — | 120 | — | — |
| Comparative Preparation Example 1 | — | — | 100 | — |
| Comparative Preparation Example 2 | — | — | — | 100 |
| Silica | 80 | 80 | 80 | 80 |
| TDAE oil | 10 | 10 | 30 | 30 |
| ZnO | 3 | 3 | 3 | 3 |
| St-A | 2 | 2 | 2 | 2 |
| 6PPD | 1 | 1 | 1 | 1 |
| X50S | 12.8 | 12.8 | 12.8 | 12.8 |
| Sulfur | 1.5 | 1.5 | 1.5 | 1.5 |
| CBS | 1.8 | 1.8 | 1.8 | 1.8 |
| DPG | 1.8 | 1.8 | 1.8 | 1.8 |

Silica: Degussa 7000GR
DPG: 1,3-diphenylguanidine

Experimental Example 2

The processability, mechanical properties, and dynamic properties of the rubber compositions for a tire tread and rubber samples prepared in Examples and Comparative Examples were measured, and results thereof are shown in the following Table 3. The properties were measured by methods described below, and measurement results thereof were converted to have higher numerical values as the specific properties were better based on the properties of Comparative Example 1.
  Hardness: measured using a Shore-A hardness tester.
  300% modulus, tensile strength, and elongation rate: measured in accordance with ASTM 3189 Method B using a universal testing machine (UTM).
  Dynamic property value (tan δ) of vulcanized rubber: analyzed under the condition of a frequency of 10 Hz and a strain of 0.2 using a DTMA V instrument commercially available from Rheometric.

TABLE 3

| Classification | Example 1 | Example 2 | Comparative Example 1 | Comparative Example 2 |
| --- | --- | --- | --- | --- |
| Processability | 101 | 98 | 100 | 81 |
| Silica dispersibility | 131 | 109 | 100 | 85 |
| Hardness | 103 | 97 | 100 | 100 |
| 300% modulus | 111 | 106 | 100 | 91 |
| Tensile strength | 97 | 83 | 100 | 88 |
| Elongation rate | 91 | 86 | 100 | 99 |
| DIN abrasion | 99 | 79 | 100 | 81 |
| Lambourn abrasion | 127 | 111 | 100 | 93 |
| Wetting resistance (tan δ at 0° C.) | 130 | 101 | 100 | 88 |
| Fuel efficiency (tan δ at 60° C.) | 113 | 89 | 100 | 91 |

Referring to Table 3, the rubber composition of Example 2, which was prepared using a copolymer including a farnesene monomer, exhibited enhanced processability and an equivalent level of hardness even though TDAE oil was used in an amount that was 20 parts by weight less than that of Comparative Example 2 which was prepared using a copolymer not including a farnesene monomer. Also, silica dispersibility, 300% modulus, Lambourn abrasion, and wetting resistance were enhanced. However, fuel efficiency and mechanical strength including tensile strength, an elongation rate, and DIN abrasion were slightly degraded by using a farnesene monomer.

In the case of Example 1 and Comparative Example 1 using a terminal-modifying agent, an interaction between the copolymer and the silica filler increased, and thus processability and silica dispersibility were enhanced. Accordingly, mechanical properties including tensile strength and 300% modulus, wetting resistance, and fuel efficiency were enhanced. Also, abrasion resistance including DIN abrasion and Lambourn abrasion was enhanced, and this results from an increase in the content of bound rubber due to reinforced bonding strength between the copolymer and the filler.

The rubber composition of Example 1, which was prepared using a copolymer using a farnesene monomer and a terminal-modifying agent, exhibited equivalent levels of processability and hardness even though TDAE oil was used in an amount that was 20 parts by weight less than that of Comparative Example 1 using only a terminal-modifying agent. Also, silica dispersibility, 300% modulus, Lambourn abrasion, and wetting resistance were enhanced. Also, since the degradation of the mechanical strength of the rubber composition, which was caused by using a farnesene monomer, was improved, equivalent levels of tensile strength, an elongation rate, and DIN abrasion were exhibited compared to the case not including a farnesene monomer, and fuel efficiency was also enhanced. Therefore, it was confirmed that the manufacture of a tire whose safety and fuel efficiency were improved was possible.

The copolymer and preparation method thereof according to some aspects of the present specification can enhance the processability of a rubber composition and furthermore enhance the abrasion resistance and dynamic properties of a tire which is a final product including the same by introducing a farnesene monomer to the main chain.

In addition, the rubber composition according to an aspect of the present specification can be applied to manufacture a high-performance tire whose safety and fuel efficiency are improved due to exhibiting excellent processability, abrasion resistance, and mechanical properties.

However, it is to be understood that the effects of the present specification are not limited to the above-described effects but include all effects deducible from the configuration of the present specification described in the detailed description of the present specification or in the claims.

The foregoing description of the present specification is intended for illustration, and it will be understood by those skilled in the art to which the specification pertains that the specification can be easily modified and implemented in various other forms without changing the technical spirit or essential features of the specification. Therefore, it should be understood that the embodiments described above are only exemplary in all aspects and not limiting. For example, each of the constituents described as being one combined entity may be implemented separately, and similarly, constituents described as being separate entities may be implemented in a combined form.

It should be understood that the scope of the present specification is defined by the following claims and that all changes or modifications derived from the meaning and scope of the claims and their equivalents are included in the scope of the specification.

What is claimed is:

1. A method of preparing a copolymer, comprising steps of:
   (a) adding a polymerization initiator to a monomer mixture including an aromatic vinyl-based monomer, a first conjugated diene-based monomer, and a farnesene monomer to initiate a reaction;
   (b) adding a second conjugated diene-based monomer; and
   (c) adding a compound represented by the following Chemical Formula 1 or Chemical Formula 2:

[Chemical Formula 1]

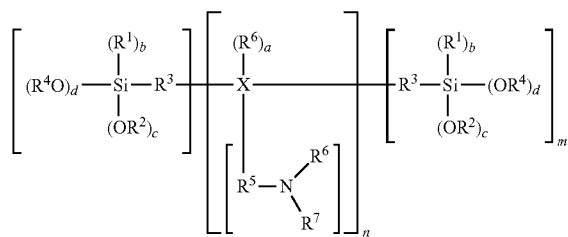

[Chemical Formula 2]

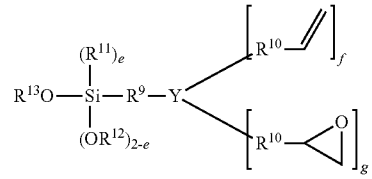

in Chemical Formula 1 and Chemical Formula 2,
$R^1$ to $R^7$ are each one of $C_1$ to $C_{20}$ saturated or unsaturated hydrocarbon chains,
$R^8$ is hydrogen (H) or one of $C_1$ to $C_{20}$ saturated or unsaturated hydrocarbon chains,
$R^9$ to $R^{13}$ are each one of $C_1$ to $C_{20}$ saturated or unsaturated hydrocarbon chains,
X is carbon (C), silicon (Si), or nitrogen (N),
Y is oxygen (O) or nitrogen (N),
a is an integer of 0 to 2,
b, c, and d are each an integer of 0 to 3 and satisfy b+c+d=3,
e, f, and g are each an integer of 0 to 2,
n is an integer of 1 to 200, and
m is an integer of 0 to 2.

2. The method of claim 1, wherein the aromatic vinyl-based monomer is one selected from the group consisting of styrene, α-methylstyrene, 2-methylstyrene, 3-methylstyrene, 4-methylstyrene, 2,4-dimethylstyrene, 2,4-diisopropylstyrene, 4-propylstyrene, 4-cyclohexylstyrene, 4-(p-methylphenyl)styrene, 5-tert-butyl-2-methylstyrene, tert-butoxystyrene, 2-tert-butylstyrene, 3-tert-butylstyrene, 4-tert-butylstyrene, N,N-dimethylaminoethylstyrene, 1-vinyl-5-hexylnaphthalene, 1-vinylnaphthalene, divinylnaphthalene, divinylbenzene, trivinylbenzene, vinylbenzyldimethylamine, (4-vinylbenzyl)dimethylaminoethylether, vinylpyridine, vinylxylene, diphenylethylene, diphenylethylene including a tertiary amine, styrene including a primary, secondary, or tertiary amine, and a combination of two or more thereof.

3. The method of claim 1, wherein the first conjugated diene-based monomer and the second conjugated diene-based monomer are each one selected from the group consisting of 1,3-butadiene, isoprene, 2,3-dimethyl-1,3-butadiene, 1,3-pentadiene, 1,3-hexadiene, 2-phenyl-1,3-butadiene, 3-methyl-1,3-pentadiene, 2-chloro-1,3-butadiene, 3-butyl-1,3-octadiene, octadiene, and a combination of two or more thereof.

4. The method of claim 1, wherein a weight ratio of the aromatic vinyl-based monomer, the first conjugated diene-based monomer, and the farnesene monomer in the monomer mixture is 20 to 50:30 to 70:10 to 30.

5. The method of claim 1, wherein the second conjugated diene-based monomer is added in an amount of 1 to 30 parts by weight based on 100 parts by weight of the first conjugated diene-based monomer.

6. A method of preparing a copolymer, comprising steps of:
(a) adding a polymerization initiator to a monomer mixture including an aromatic vinyl-based monomer, a first conjugated diene-based monomer, and a farnesene monomer to initiate a reaction;
(b) adding a second conjugated diene-based monomer; and
adding a terminal-modifying compound,
wherein the terminal-modifying compound is one selected from the group consisting of piperidine, 1-[(4-ethylphenyl)methyl]-pyrrolidine, 1-(4-vinylbenzyl)pyrrolidine, N1-(3-(dimethylamino)propyl)-N3,N3-dimethyl-N1-(4-vinylbenzyl)propane-1,3-diamine, N1-(3-(dimethylamino)propyl)-N3,N3-dimethyl-N1-(4-vinylphenethyl)propane-1,3-diamine, N1-(2-(dimethylamino)ethyl)-N2,N2-dimethyl-N1-(4-vinylbenzyl)ethane-1,2-diamine, N1-(3-(diethylamino)propyl)-N3,N3-diethyl-N1-(4-vinylbenzyl)propane-1,3-diamine, triethoxysilylpropyldiethylamine, 3-glycidoxypropyldimethyldimethoxysilane, dimethyldichlorosilane, trimethylchlorosilane, methyldichlorosilane, methyltrichlorosilane, phenyltrichlorosilane, vinyltrichlorosilane, and a combination of two or more thereof.

7. A copolymer comprising an aromatic vinyl-based monomer, a conjugated diene-based monomer, and a farnesene monomer and having an aromatic vinyl-based block content of less than 1 wt %, wherein at least one end of the copolymer is modified with a compound represented by the following Chemical Formula 1 or Chemical Formula 2:

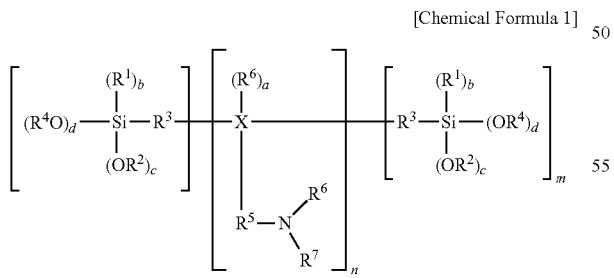

[Chemical Formula 1]

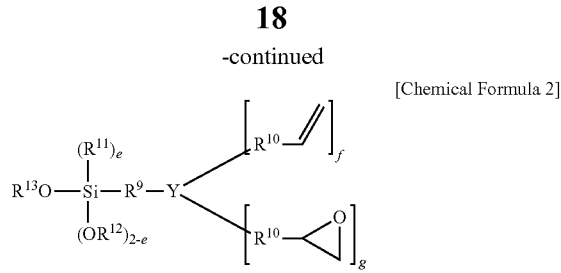

[Chemical Formula 2]

in Chemical Formula 1 and Chemical Formula 2, $R^1$ to $R^7$ are each one of $C_1$ to $C_{20}$ saturated or unsaturated hydrocarbon chains, $R^8$ is hydrogen (H) or one of $C_1$ to $C_{20}$ saturated or unsaturated hydrocarbon chains, $R^9$ to $R^{13}$ are each one of $C_1$ to $C_{20}$ saturated or unsaturated hydrocarbon chains, X is carbon (C), silicon (Si), or nitrogen (N), Y is oxygen (O) or nitrogen (N), a is an integer of 0 to 2, b, c, and d are each an integer of 0 to 3 and satisfy b+c+d=3, e, f, and g are each an integer of 0 to 2, n is an integer of 1 to 200, and m is an integer of 0 to 2.

8. A rubber composition comprising the copolymer of claim 7 a filler.

9. A copolymer comprising an aromatic vinyl-based monomer, a conjugated diene-based monomer, and a farnesene monomer and having an aromatic vinyl-based block content of less than 1 wt %, wherein at least one end of the copolymer is modified with a terminal-modifying compound, and the terminal-modifying compound is one selected from the group consisting of piperidine, 1-[(4-ethylphenyl)methyl]-pyrrolidine, 1-(4-vinylbenzyl)pyrrolidine, N1-(3-(dimethylamino)propyl)-N3,N3-dimethyl-N1-(4-vinylbenzyl)propane-1,3-diamine, N1-(3-(dimethylamino)propyl)-N3,N3-dimethyl-N1-(4-vinylphenethyl)propane-1,3-diamine, N1-(2-(dimethylamino)ethyl)-N2,N2-dimethyl-N1-(4-vinylbenzyl)ethane-1,2-diamine, N1-(3-(diethylamino)propyl)-N3,N3-diethyl-N1-(4-vinylbenzyl)propane-1,3-diamine, triethoxysilylpropyldiethylamine, 3-glycidoxypropyldimethyldimethoxysilane, dimethyldichlorosilane, trimethylchlorosilane, methyldichlorosilane, methyltrichlorosilane, phenyltrichlorosilane, vinyltrichlorosilane, and a combination of two or more thereof.

10. A rubber composition comprising the copolymer of claim 9 and a filler.

* * * * *